United States Patent [19]
Wilson et al.

[11] Patent Number: 5,464,496
[45] Date of Patent: Nov. 7, 1995

[54] PLASTIC PIPE BUTT FUSION MACHINE

[75] Inventors: Michael L. Wilson; Kenneth K. Chan, both of Tulsa, Okla.

[73] Assignee: TDW Delaware Inc., Wilmington, Del.

[21] Appl. No.: 250,643

[22] Filed: May 27, 1994

Related U.S. Application Data

[63] Continuation of Ser. No. 991,573, Dec. 16, 1992, abandoned.

[51] Int. Cl.$^6$ .................................................. B32B 35/00
[52] U.S. Cl. .................. 156/499; 156/503; 269/267; 269/86; 269/227; 267/69; 74/422; 74/89.17
[58] Field of Search ................ 269/267, 86, 227; 156/499, 503; 74/422, 89.17; 464/57, 97, 168, 169; 267/69; 16/75

[56]  References Cited

U.S. PATENT DOCUMENTS

| | | | |
|---|---|---|---|
| 1,516,477 | 11/1924 | Schofield | 464/57 |
| 3,561,749 | 2/1971 | Grover | 269/227 |
| 3,651,536 | 3/1972 | Bolzan | 15/323 |
| 3,678,781 | 6/1972 | Rohrberg | 74/571 |
| 3,697,162 | 10/1972 | Geils | 353/120 |
| 3,720,993 | 3/1973 | Farmer | 29/470.3 |
| 3,729,360 | 4/1973 | McElroy | 156/499 |
| 3,738,636 | 6/1973 | Reinke | 269/49 |
| 3,745,273 | 7/1973 | Harris | 200/40 |
| 3,752,391 | 8/1973 | Leonard | 234/51 |
| 3,793,119 | 2/1974 | Province | 156/499 |
| 3,846,208 | 11/1974 | McElroy | 156/499 |
| 3,926,515 | 12/1975 | Nagahara | 355/3 |
| 4,027,415 | 6/1977 | Stoner | 42/50 |
| 4,049,762 | 9/1977 | Martino | 264/531 |
| 4,263,820 | 4/1981 | Wetherald | 74/594.2 |
| 4,323,752 | 4/1982 | Paton | 219/101 |
| 4,352,708 | 10/1982 | McElroy | 156/378 |
| 4,429,920 | 2/1984 | Kondziola | 297/478 |
| 4,445,677 | 5/1984 | Hansen et al. | 269/41 |
| 4,507,119 | 3/1985 | Spencer | 156/304.2 |
| 4,533,424 | 8/1985 | McElroy | 156/378 |
| 4,542,892 | 9/1985 | Goldner | 269/41 |
| 4,556,207 | 12/1985 | Thompson et al. | 269/41 |
| 4,640,732 | 2/1987 | Stafford | 156/358 |
| 4,684,430 | 8/1987 | Handa | 156/366 |
| 4,714,513 | 12/1987 | McAlister | 156/359 |
| 4,792,374 | 12/1988 | Rianda | 156/503 |
| 4,927,999 | 5/1990 | Hanselka | 219/535 |
| 5,013,376 | 5/1991 | McElroy et al. | 156/64 |
| 5,090,827 | 2/1992 | Hirano | 400/185 |
| 5,150,770 | 9/1992 | Secci | 185/40 |
| 5,169,683 | 12/1992 | Matsui | 427/240 |

FOREIGN PATENT DOCUMENTS

| | | |
|---|---|---|
| 0405963 | 2/1991 | European Pat. Off. . |
| 62-030026 | 9/1987 | Japan . |
| 710856 | 6/1954 | United Kingdom . |

*Primary Examiner*—W. Gary Jones
*Assistant Examiner*—Mark De Simone
*Attorney, Agent, or Firm*—Head & Johnson

[57] ABSTRACT

A plastic pipe butt fusion machine has a base, a clamp on the base for securing a first length of plastic pipe, a second clamp mounted on the base for securing a second length of plastic pipe to be fusion welded to the first in axial end-to-end alignment, the second clamp being moveable relative to the base, a spring positioned between the second clamp and the base so that when the spring is tension loaded the second clamp is urged in the direction toward the first clamp to thereby resiliently urge the plastic pipes held by the first and second clamps into axial abutted relationship during fusion.

3 Claims, 3 Drawing Sheets

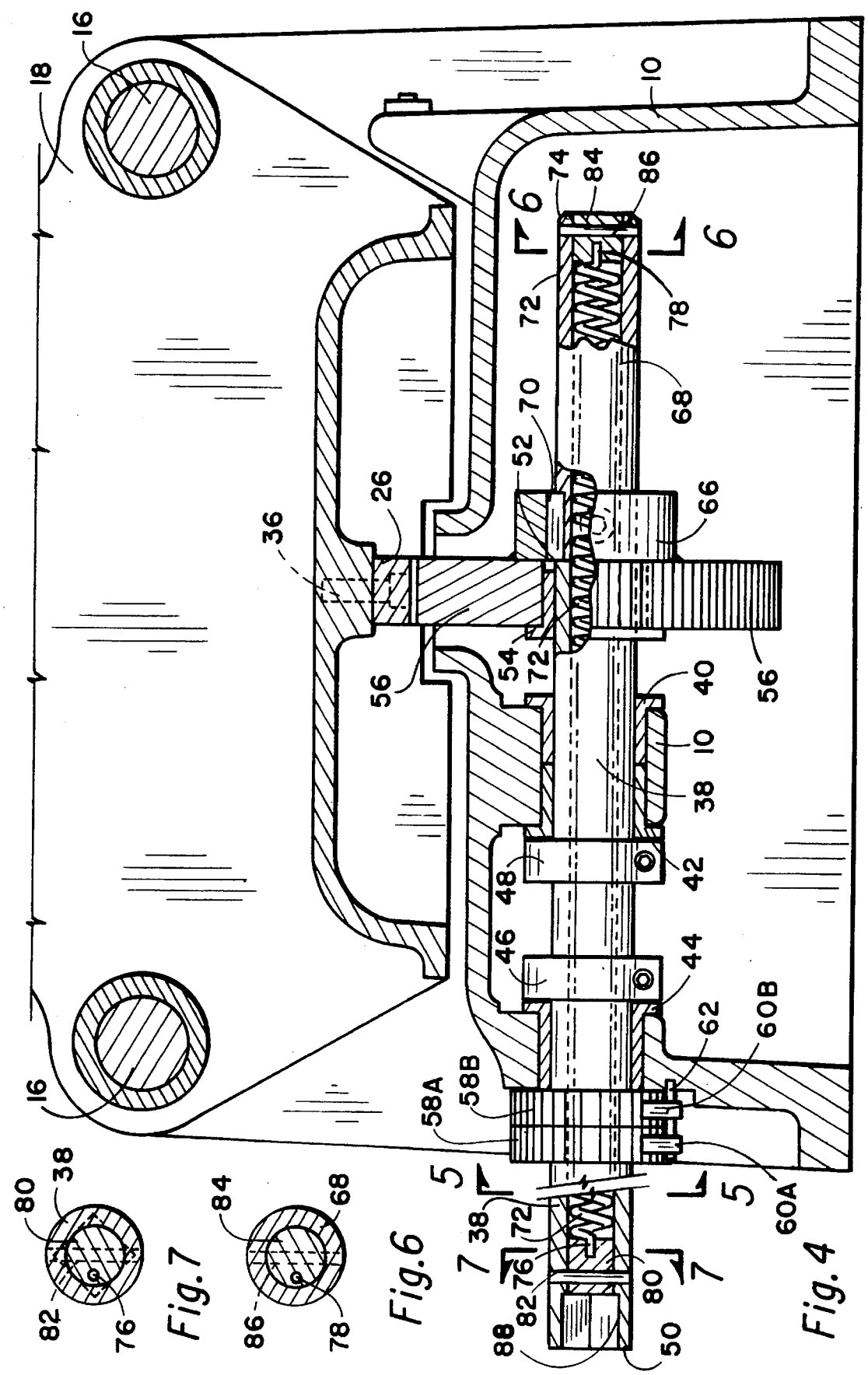

PLASTIC PIPE BUTT FUSION MACHINE

This is a continuation of application Ser. No. 07/991,573 filed on Dec. 16, 1992, now abandoned.

BACKGROUND OF THE INVENTION

1. Field Of The Invention

Plastic pipe is commonly used today in gas and water piping systems as well as other industrial applications. Thermoplastic pipe is superior to metal pipe in many applications since it is not subject to rust, corrosion or electrolysis and when buried in the ground it has an exceedingly long life. One of the advantages of the use of plastic pipe is that it can easily be joined end-to-end by heat fusion. That is, the ends of the plastic pipe can be heated and, while in a molten or semi-molten state, forced into contact with each other. When the molten plastic at the ends is allowed to solidify, which takes place rather quickly, the pipe is joined.

Machines for butt fusion of plastic pipe have long been used. A butt fusion machine typically includes a frame that supports a first clamp for holding the end portion of one length of plastic pipe and a second clamp for holding the end portion of a second length of plastic pipe. The second clamp is movable on the machine frame. The pipes to be joined can be clamped into position with their ends spread apart. A platen heating element can be applied to heat the opposed ends of the pipe to fusion temperature. The platen is removed and while the ends are in the molten state, the second clamp is moved to force the ends of the pipe in direct axially aligned contact with each other. The pipes are held in this position until the molten plastic solidifies, thereby joining two lengths of pipe. Usually the movement of the second clamp toward the first clamp is controlled by a manually operated lever or gear. A problem exists in that the amount of force employed in moving the pipes toward each other is controlled by the operator. If too little axial force is applied, a poor bond is obtained with the results that the pipes later separate, particularly when subjected to internal fluid pressure. On the other hand, if too much pressure is applied while the ends are in the fusion state large internal and external beads of molten plastic are formed. The internal beads are particularly undesirable since they restrict the flow of fluid through the pipe and serve to impede passage of any physical object that might be run through the pipe.

2. The Prior Art

Devices for butt fusion of thermoplastic pipe are illustrated and described in the following United States Patents:

| U.S. Pat. No. | Title | Issued |
|---|---|---|
| 3,729,360 | Portable Thermoplastic Pipe Fusion apparatus | Apr 24, 1973 |
| 3,793,119 | Facing Tool For Plastic Pipe Fusion Apparatus | Feb 19, 1974 |
| 3,846,208 | Combination Pipe Fusion Unit | Nov 05, 1974 |
| 4,310,737 | Pipe Resistance Butt Welding Apparatus | Jan 12, 1982 |
| 4,352,708 | Defined Force Fusion Machine For Joining Plastic Pipe | Oct 05, 1982 |
| 4,323,752 | Pipe Resistance Butt Welding Apparatus | Apr 06, 1982 |
| 4,445,677 | Clamping Apparatus For Plastic Pipe | May 01, 1984 |
| 4,533,424 | Pipe Fusion Apparatus with Load Cell For Attaching Side Wall Fittings | Aug 06, 1985 |
| 4,542,892 | Poly-Pipe Fusion Machine | Sep 24, 1985 |
| 4,556,207 | Clamping Apparatus For Plastic Pipe | Dec 03, 1985 |
| 4,640,732 | Apparatus For Fusion Joining Of Thermoplastic Pipes | Feb 03, 1987 |
| 4,714,513 | Apparatus For Fusion Welding Plastic Pipe Joints | Dec 22, 1987 |
| 4,792,374 | Apparatus For Fusion Joining Plastic Pipe | Dec 20, 1988 |
| 4,927,999 | Apparatus For Fusion Joining Plastic Pipe | May 22, 1990 |
| 5,013,376 | Programmable Computer Controlled Pipe Fusion Device | May 07, 1991 |

In addition, a machine for butt fusion of pipe that functions as above described has been sold for many years by T. D. Williamson, Inc. of Tulsa, Okla. and identified as the "TD-45 Polyfuse Butt-Fusion Machine." The operation and maintenance manual describing this machine was published in 1990 and shows a machine as above described in which a lever is manually applied to move the pipes toward each other during the butt fusion process. The present disclosure is an improvement in the machine of the type as particularly described in the "TD-45 Polyfuse Butt-Fusion Machine" and wherein, instead of employing a manually operated lever for moving the lengths of pipe into abutting relation for fusion bonding, spring tension is employed.

The use of spring tension helps alleviate variations in the fusion process that occur with manual operation of the butt fusion machine and provides a means of applying more uniform compressive force between the lengths of pipe.

SUMMARY OF THE INVENTION

An improved plastic pipe butt fusion machine is provided. The machine includes a base or frame that supports a first clamp. The end portion of a first length of pipe is secured in the first clamp. The machine also supports a second clamp into which the end portion of a second length of pipe is secured. The second clamp is movable relative to the first clamp, the movement taking place so that at all times the two lengths of pipe are supported in axial alignment. By movement of the second clamp, the spacing between the end of the pipes to be joined can be varied.

A spring element is provided for applying compressive tension between the second clamp and the base. When the spring is placed under tension a substantially constant force is employed for moving the second clamp toward the first clamp.

In the preferred arrangement of the invention the second clamp is provided with an elongated linear gear rack that meshes with a cylindrical gear rotatably supported by the frame. A coiled spring applies rotational torque to the cylindrical gear that, in turn, acts on the linear gear rack to cause the second clamp to be resiliently biased in the direction toward the first clamp so that a predetermined force can be applied to the movable clamp relative to the first clamp during the fusion bonding process.

DETAILED DESCRIPTION OF THE DRAWINGS

FIGS. 1, 2 and 3 illustrate a prior art machine of the type typically employed for butt fusion of thermoplastic pipe.

FIG. 4 is a cross-sectional view as in FIG. 3 but showing a modified arrangement of the butt fusion machine and showing means wherein the machine of FIGS. 1, 2 and 3 is modified to provide compressive tension to move the movable clamp portion toward the fixed clamp portion with a predetermined force during butt fusion of two lengths of plastic pipe.

FIG. 6 is a cross-sectional view of a spring end retainer as taken along the line 6—6 of FIG. 4.

FIG. 7 is a cross-sectional view of the spring retainer at the opposite end of the tubular spring housing for locking the end of a spring to a spring housing.

DESCRIPTION OF THE PREFERRED EMBODIMENT

Figure 1:
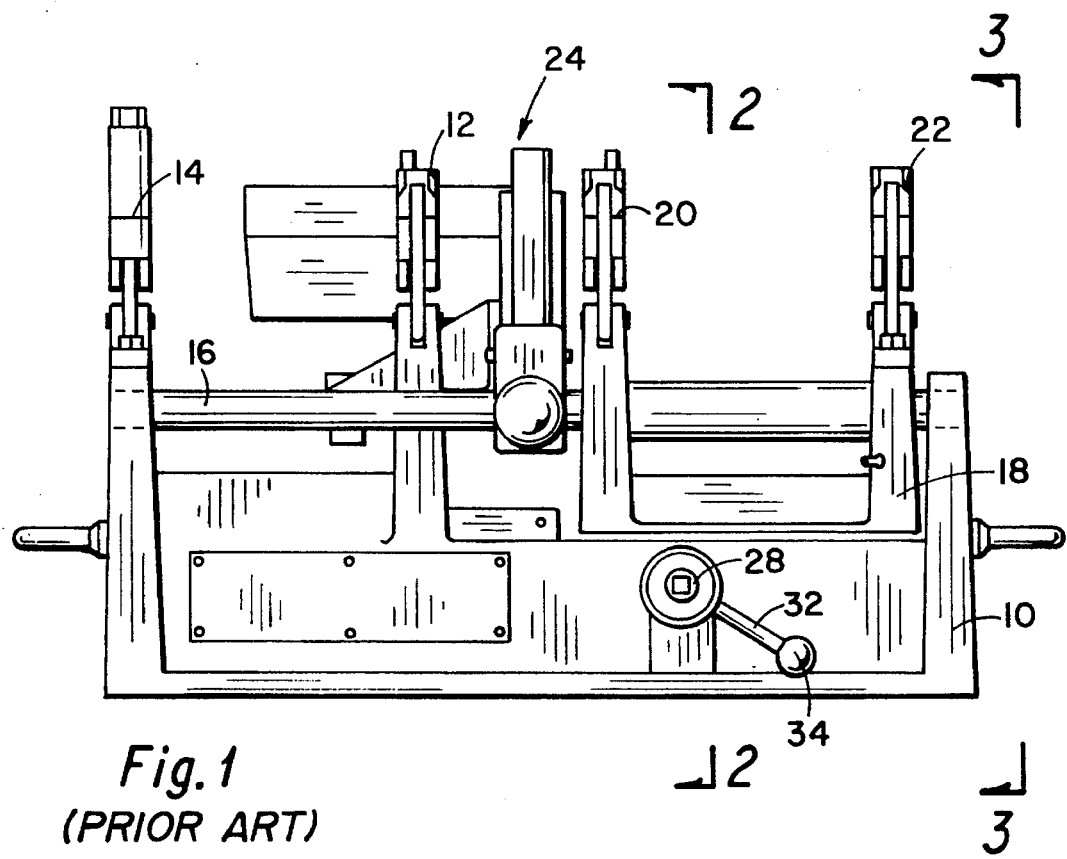
FIG. 1 is an elevational view of a prior art machine for use in butt fusion of plastic pipes end-to-end.
Figure 3:
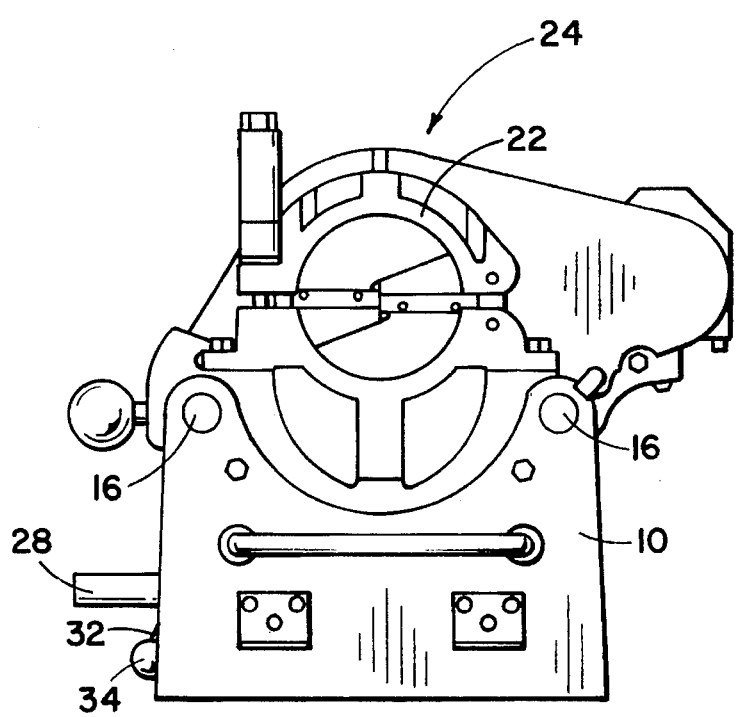
FIG. 3 is an end view of the prior art butt fusion machine of FIGS. 1 and 2.
Figure 2:
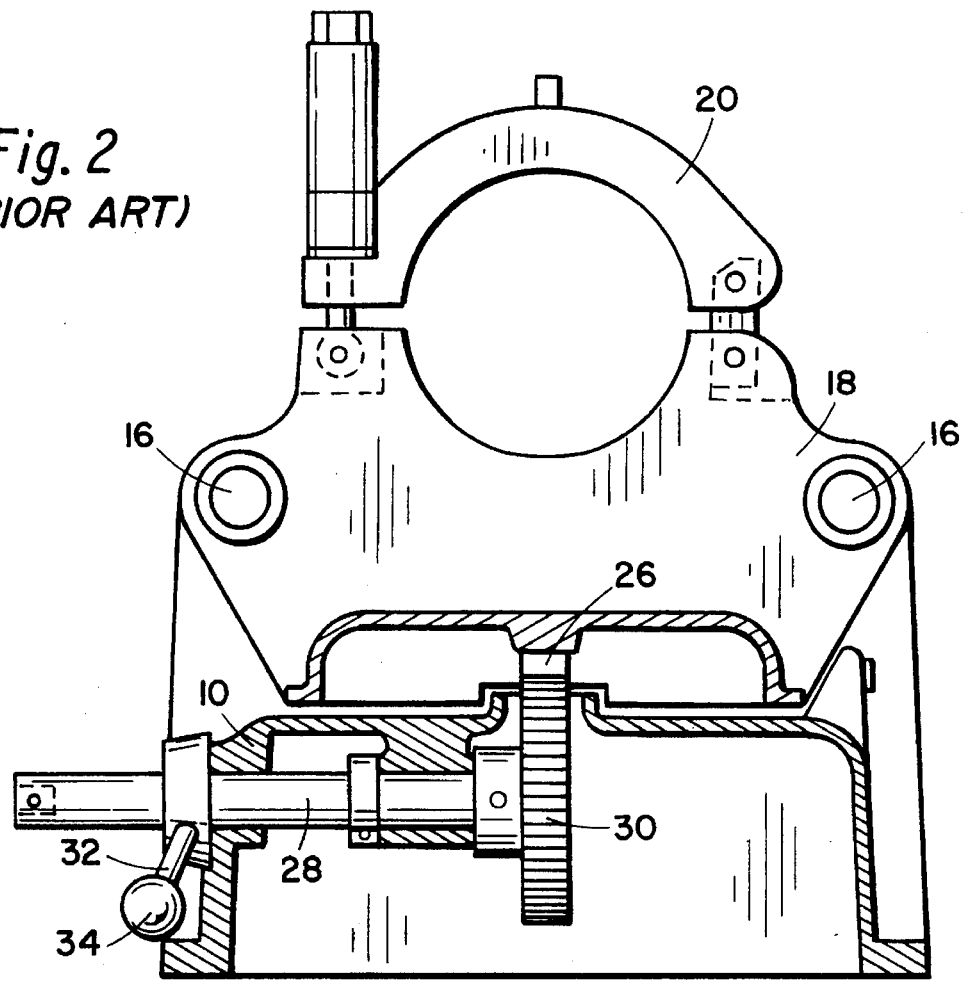
FIG. 2 is a cross-sectional view taken along the line 2—2 of FIG. 1 showing a cross-sectional view of the prior art machine of FIG. 1.

Referring to FIGS. 1, 2 and 3 a machine of the type in present use for butt fusion thermoplastic pipe is illustrated. The machine includes a frame 10 that supports stationary clamps 12 and 14. The stationary clamps are adaptable to receive the end portion of one length of a pipe to be joined. The frame includes elongated paralleled slidebars or guide rods 16 on which is movably supported a movable clamp base 18. Mounted on movable clamp base 18 are movable clamps 20 and 22. The end portion of a second length of plastic pipe is secured in clamps 20 and 22. With the first length of plastic pipe secured in stationary clamps 12 and 14 and a second length of plastic pipe in movable clamps 20 and 22, the spacing between the abutted end of the pipe can be varied by shifting movable clamp base 18.

Shown in FIG. 3 is a facer mechanism, generally indicated by the numeral 24. This mechanism is pivoted into position between stationary clamps 12, 14 and movable clamps 20, 22 to shape the ends of pipe to be butt fused. Facer mechanism 24 is typical of butt fusion machines and is not directly related to the unique concepts that constitute the improvement of this invention.

FIG. 2 is a cross-sectional view that shows the means of moving clamp base 18 toward and away from fixed clamps 12, 14. As previously indicated, movable clamp base 18 slides on spaced apart and paralleled guide rods 16. The movable clamp base has a linear gear rack 26 seen in cross-section perpendicular the longitudinal length thereof. A shaft 28 is rotatably supported to frame 10. The axis of shaft 28 is perpendicular the vertical plane of linear gear rack 26. Affixed to shaft 28 is a cylindrical gear 30 that meshes with linear gear rack 26. Also affixed to the shaft is a lever 32 having a ball 34 on the outer end thereof. The operator manually engages ball 34 to rotate shaft 28 that, in turn, rotates gear 30 to move the movable clamp base 18 on frame 10. Thus, as illustrated in FIGS. 1, 2, and 3, the prior art machine employs manually controlled movement of the movable clamp base 18 and therefore movable clamps 20, 22 toward and away from fixed clamps 12, 14.

The purpose of the present invention is to provide an improved means of applying force to move the movable clamp base 18 with respect to frame 10 and therefore to provide improved means of preselectably controlling the force applied to abutted length of thermoplastic pipe during the butt fusion process. This improved means is illustrated in FIGS. 4-7.

FIG. 4 can be compared to the prior art machine of FIG. 2. Linear gear rack 26 is secured to movable clamp base 18 by means of bolts 36. Rotatably supported to frame 10 is a tubular spring housing first part 38. Spring housing first part 38 is supported to frame 10 by means of bushings 40, 42 and 44 and is held in axial position by means of clamps 46 and 48. Tubular spring housing first part 38 has an outer end 50 and an inner end 52. At the inner end a bushing 54 rotatably receives cylindrical gear 56, the gear having teeth on the exterior surface thereof that engage the teeth on gear rack 26.

Secured externally of frame 10 are ratchet gears 58A and 58B. Pivotally supported ratchet dogs 60A and 60B (see FIG. 5) engage the teeth on ratchet gears 58A and 58B respectively. Ratchet dogs 60A, 60B are each pivotally supported about a pin 62 and resiliently biased towards the ratchet gears by means of a spring 64, as specifically shown in FIG. 5.

Referring back to FIG. 4, cylindrical gear 56 has secured to it a bushing 66 which, in turn, has a tubular spring housing second part 68 attached to it. Tubular spring housing second part 68 is held in abutted relationship and in axial alignment with tubular spring housing first part 38. A key 70 rotatably locks spring housing second part 68 to gear 56. Thus, tubular spring housing first part 38 rotatably supports gear 56, but gear 56 is independently rotatable relative to the spring housing first part. The spring housing second part 68 is locked to and rotates with gear 56.

Positioned within the interior of the aligned spring housing first and second parts 38, 68 is a coiled spring 72. The spring extends from near the first spring housing first end 50 to the second spring housing rearward end 74. Spring 72 has a first end 76 and a second end 78. A cylindrical spring keeper 80 has a recess therein that receives the first spring end 76. Keeper 80 is rotatably secured to the tubular spring housing first part 38 by means of a pin 82. In like manner, a keeper 84 receives the second end 78 of spring 72 and is locked to tubular spring housing second part 68 by means of a pin 86.

The outer end 50 of tubular spring housing first portion 38 has a square recess 88 therein.

To apply rotatable tension to spring 72 the square end of a wrench (not shown) is inserted into square recess 88 in the end of tubular spring housing first part 38. The spring housing is rotated counterclockwise. With gear 56 stationary, that is, wherein movable clamp base 18 does not move, tension is applied to the spring as the tubular spring housing first part 38 rotates. This tension is retained by ratchet gears 58A and 58B as engaged by ratchet dogs 60A and 60B (see FIGS. 4 and 5). In this manner, the force tending to move the movable clamp base 18 in the direction toward fixed clamps 12, 14 is controlled entirely by the force applied by spring 72. That is, there is no direct mechanical linkage between the rotation of the tubular spring housing first part 38 and cylindrical gear 56. This thereby eliminates the use of manually applied force to urge movable clamps 20, 22 towards stationary clamps 12, 14.

Figure 5:
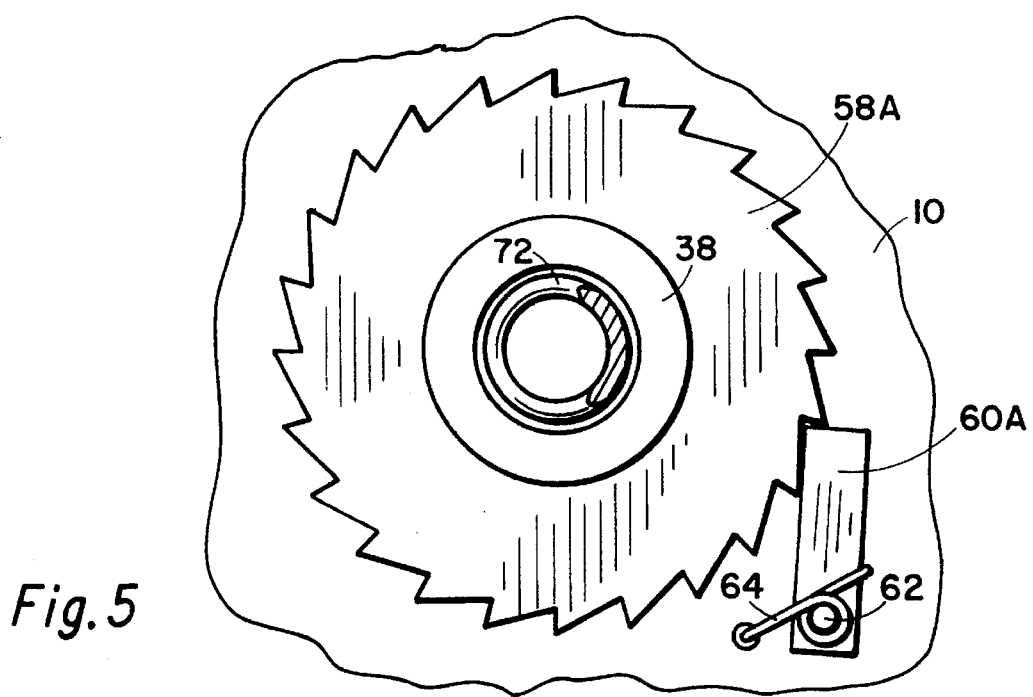
FIG. 5 is an end view of the improved arrangement of FIG. 4, taken along the line 5—5 of FIG. 4, showing a ratchet gear for retaining spring tension in the machine.

The ratcheting arrangement of FIGS. 4 and 5 is merely exemplary as other ratcheting systems may be provided. Further, means will be employed to release the ratcheting mechanism as required that are not illustrated since such means may vary considerably in detail and are not directly related to the concept of this disclosure. Further, spring 72 is illustrated as a coiled spring. It is understood that instead of coiled spring 72 a torsion bar (not shown) can be employed, that is, a bar of resilient material that is twisted as tubular spring housing first part 38 is rotated relative to gear 56. The cross-sectional shape of such tubular bar may vary. It may be round, square or may be rectangular in cross-sectional configuration.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An butt fusion machine for joining end-to-end lengths of rigid plastic pipe, comprising:

a base;

a first clamping means supported by said base for securing a first length of plastic pipe;

a second clamping means supported by said base for securing a second length of plastic pipe, the first and second lengths of pipe being supported in coaxial arrangement, at least said second clamping means being displacably supported by said base and moveable towards and away from said first clamping means while maintaining said lengths of plastic pipe in coaxial relationship;

an elongated spring having a first and a second end;

an elongated linear gear rack affixed to said second clamping means;

a cylindrical gear rotatably supported by said base and engaging said gear rack;

an elongated tubular spring housing having a first and a second part, the parts being in axial alignment, a substantial portion of said spring being received in each of said spring housing first and second parts, said spring housing first part being rotatably supported to said base and said spring housing second part being secured coaxially to said cylindrical gear, said spring second end being secured to said spring housing second part and said spring first end being secured to said spring housing first part;

means to tension load said spring by rotating said spring housing first part relative to said spring housing second part; and a ratchet means coaxially secured between said tubular spring housing first part and said base permitting rotation of said spring housing first part in one direction to tension load said spring but prohibiting rotation of said spring housing first part in the opposite direction.

2. An plastic pipe butt fusion machine according to claim 1 wherein said spring is an elongated spring.

3. An plastic pipe butt fusion machine according to claim 1 wherein said ratchet means comprises:

a ratchet gear means coaxially secured to said tubular spring housing first part; and a ratchet dog member pivotally supported to said base permitting rotation of said spring housing in one direction to tension load said spring but prohibiting rotation of said spring housing first part in the opposite direction.

* * * * *